United States Patent
Kasazumi et al.

(10) Patent No.: US 9,135,847 B2
(45) Date of Patent: Sep. 15, 2015

(54) IMAGE DISPLAY APPARATUS

(71) Applicant: PANASONIC CORPORATION, Osaka (JP)

(72) Inventors: Kenichi Kasazumi, Osaka (JP); Keiji Sugiyama, Kyoto (JP); Kakuya Yamamoto, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 245 days.

(21) Appl. No.: 13/988,197

(22) PCT Filed: Oct. 18, 2012

(86) PCT No.: PCT/JP2012/006683
§ 371 (c)(1),
(2) Date: May 17, 2013

(87) PCT Pub. No.: WO2013/057951
PCT Pub. Date: Apr. 25, 2013

(65) Prior Publication Data
US 2014/0198141 A1    Jul. 17, 2014

(30) Foreign Application Priority Data
Oct. 20, 2011    (JP) .................... 2011-230500

(51) Int. Cl.
*G09G 3/02*    (2006.01)
*G02B 26/08*    (2006.01)
*G02B 27/22*    (2006.01)
(Continued)

(52) U.S. Cl.
CPC .............. *G09G 3/02* (2013.01); *G02B 26/0808* (2013.01); *G02B 27/2271* (2013.01);
(Continued)

(58) Field of Classification Search
CPC ............ G09G 3/3611; G09G 2360/16; G09G 2320/0626; G09G 3/02; G02B 26/0808; G02B 27/2271; G02B 26/0825; G02B 26/0833; G02B 26/0841; G03H 1/2286; G03H 2240/51; G03H 2222/18; G03H 1/2294; G03H 2210/20; G03H 2001/2271; G03H 2225/52; G03H 2225/00; G03H 2225/30; G03H 2225/03; G03H 2225/32; G03H 2225/24
USPC ............... 345/697; 348/678, E5.119, E5.139, 348/687; 359/1, 9, 29
See application file for complete search history.

(56) References Cited

U.S. PATENT DOCUMENTS

2006/0250671 A1    11/2006  Schwerdtner et al.
2007/0046829 A1 *   3/2007  Su et al. ................... 348/678
(Continued)

FOREIGN PATENT DOCUMENTS

| JP | 6-202575 | 7/1994 |
|---|---|---|
| JP | 2006-154437 | 6/2006 |
| JP | 2008-541145 | 11/2008 |
| JP | 2009-540352 | 11/2009 |
| JP | 2011-503650 | 1/2011 |
| WO | WO 2012007763 A1 * | 1/2012 |

OTHER PUBLICATIONS

International Search Report issued Dec. 11, 2012 in corresponding PCT International Application No. PCT/JP2012/006683.

*Primary Examiner* — Alexander Eisen
*Assistant Examiner* — Abhishek Sarma
(74) *Attorney, Agent, or Firm* — Wenderoth, Lind & Ponack, L.L.P.

(57) ABSTRACT

An image display apparatus, including: a light source which emits coherent light; a spatial modulation element which diffracts the coherent light by displaying a diffraction grating pattern corresponding to an input image and which displays a virtual image by the diffracted light; and a control unit which calculates a total brightness representing a sum total of brightnesses of all pixels of the input image, and controls at least one of the light source and the spatial modulation element in such a manner that, if the total brightness has decreased, the virtual image is displayed at a lower brightness than a reference virtual image displayed when the input image is used directly.

8 Claims, 12 Drawing Sheets

(51) Int. Cl.
*G09G 3/36* (2006.01)
*G03H 1/22* (2006.01)

(52) U.S. Cl.
CPC .......... *G03H 1/2294* (2013.01); *G09G 3/3611* (2013.01); *G03H 1/2286* (2013.01); *G03H 2222/18* (2013.01); *G03H 2240/51* (2013.01); *G09G 2320/0626* (2013.01); *G09G 2360/16* (2013.01)

(56) References Cited

U.S. PATENT DOCUMENTS

| | | | |
|---|---|---|---|
| 2009/0103151 A1* | 4/2009 | Horikawa | 359/9 |
| 2009/0225380 A1 | 9/2009 | Schwerdtner et al. | |
| 2010/0238528 A1 | 9/2010 | Govil et al. | |
| 2010/0277566 A1 | 11/2010 | Cable et al. | |

* cited by examiner

FP

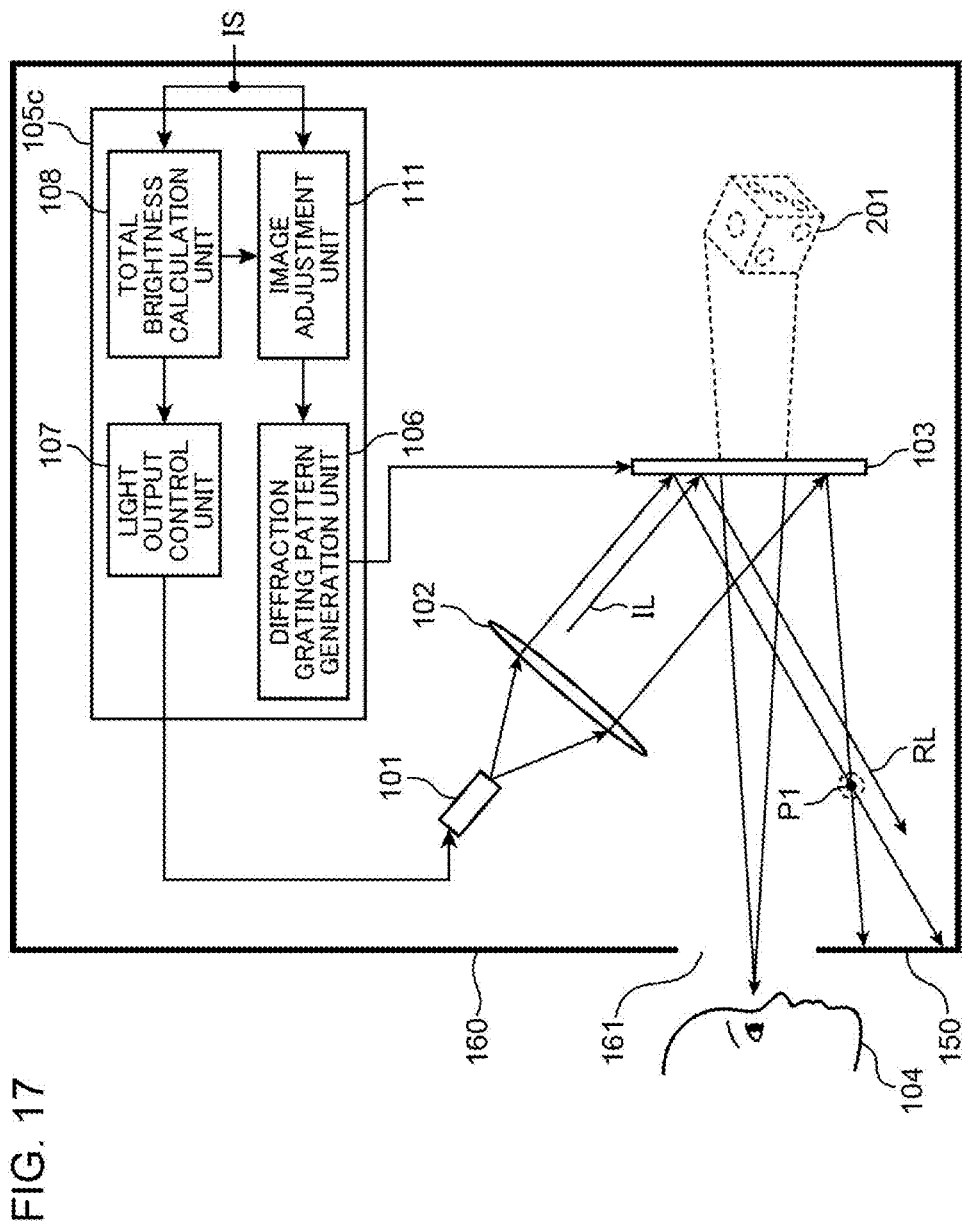

IMAGE DISPLAY APPARATUS

TECHNICAL FIELD

The present invention relates to an image display apparatus which displays an image by diffracting coherent light using a diffraction grating pattern.

BACKGROUND ART

One type of image display apparatus which displays an image by diffracting coherent light using a diffraction grating pattern is an image display apparatus which uses a computer generated hologram (hereinafter called "CGH").

In this image display apparatus, a diffraction grating pattern determined by a computer on the basis of an input image corresponding to a target display image that is to be displayed is displayed on a phase modulation type of liquid crystal panel, or the like, and by irradiating laser light onto the liquid crystal panel so as to cause diffraction, a wave front of display light from a virtual image position is reproduced and a virtual image is displayed to a user. As a result of this, a characteristic feature of the CGH method is that a three-dimensional stereoscopic image can be displayed at a position in front of or behind the liquid crystal panel.

For example, one image display apparatus which displays a three-dimensional stereoscopic image by a CGH method is a three-dimensional scene holographic reconstruction apparatus (see Patent Document 1). Furthermore, although it does not involve a CGH method, there is also an image display apparatus which displays a three-dimensional stereoscopic image to a user by a diffraction grating pattern (see Patent Document 2).

In the image display apparatus which uses the CGH method described above, although a large amount of research has been carried out into a three-dimensional image display method which produces a natural three-dimensional effect, such a method has not come into common use yet, for reasons such as the fact that it requires a laser light source and a spatial modulation element having a small pixel pitch and a large number of pixels. However, in recent years, liquid crystal panels for a projector have achieved higher definition, and furthermore higher output has been achieved in visible-range semiconductor lasers and an image display apparatus using a CGH method has come close to practical application.

As described above, a conventional image display apparatus using a CGH method irradiates laser light onto a spatial modulation element which is displayed in superimposed fashion with a diffraction grating pattern on respective pixels of an input image, and displays an image by laser light diffracted by the displayed diffraction grating pattern.

Here, when displaying an input image in which a large number of pixels of high brightness are present, a plurality of diffraction grating patterns are superimposed, and therefore the respective diffraction grating patterns are unclear. As a result of this, the diffracted light on the displayed pixels is reduced and pixels are displayed at a lower brightness than the brightness that should be displayed. Conversely, when displaying an input image in which there is only a small number of pixels of high brightness, the extent of superimposition of the diffraction grating patterns is small, and therefore the diffraction grating patterns of the respective pixels are displayed clearly. As a result of this, the diffracted light on the displayed pixels is increased and pixels are displayed at a higher brightness than the brightness that should be displayed.

From another perspective, the diffraction efficiency of laser light irradiated onto the spatial modulation element does not change greatly with the input image, and the sum total of the brightness of the whole virtual image does not change greatly. Therefore, if the input image contains a large number of pixels having a high brightness, the laser light is distributed to a large number of pixels and the pixels of the virtual image are displayed at low brightness. On the other hand, when the input image only contains a small number of pixels of high brightness, then the laser light is concentrated in a small number of pixels and the pixels of the virtual image are displayed at a higher brightness. In this way, when displaying an image by a computer hologram, since the diffraction efficiency is virtually uniform, then if there is a small number of bright pixels in the input image, the brightness becomes higher than the brightness that should be displayed, and conversely, if there is a large number of bright pixels, the brightness becomes lower than the brightness that should be displayed.

Furthermore, by using laser light sources of three types, a red, green and blue light source, and superimposing and outputting the images of the respective colors, it is possible to achieve a full color image display, but when a full color image display is performed, then color deviations occur in the virtual image if there is variation in the number of pixels having high brightness in the input images of the respective colors, as described above.

In this way, in a conventional image display apparatus which uses a CGH method, when performing a moving image display, the number of pixels having high brightness in the input image changes, and therefore the brightness and display color change with the scene and similarly, when displaying an information image such as text characters, the number of pixels of high brightness in the input image changes with the number of text characters, and hence there is a problem in that the brightness and display color change, and so on.

Patent Document 1: Japanese Translation of PCT Application No. 2008-541145

Patent Document 2: Japanese Patent Application Publication No. 6-202575

SUMMARY OF THE INVENTION

It is an object of the present invention to provide an image display apparatus which is capable of displaying a virtual image at a desired brightness, without being affected by variation in the number of pixels of high brightness in the input image.

The image display apparatus relating to one aspect of the present invention includes: a light source which emits coherent light; a spatial modulation element which diffracts the coherent light by displaying a diffraction grating pattern corresponding to an input image and which displays a virtual image by the diffracted light; and a control unit which calculates a total brightness representing a sum total of brightnesses of all pixels of the input image, and controls at least one of the light source and the spatial modulation element in such a manner that, if the total brightness has decreased, the virtual image is displayed at a lower brightness than a reference virtual image displayed when the input image is used directly.

The image display apparatus described above can display a virtual image at a desired brightness, without being affected by variation in the number of pixels of high brightness in the input image.

BRIEF DESCRIPTION OF THE DRAWINGS

FIG. 17 is a schematic drawing showing a further composition of an image display apparatus according to a third embodiment of the present invention.

BEST MODE FOR CARRYING OUT THE INVENTION

Below, an embodiment of the present invention is described with reference to the drawings.

(First Embodiment)

Figure 1:
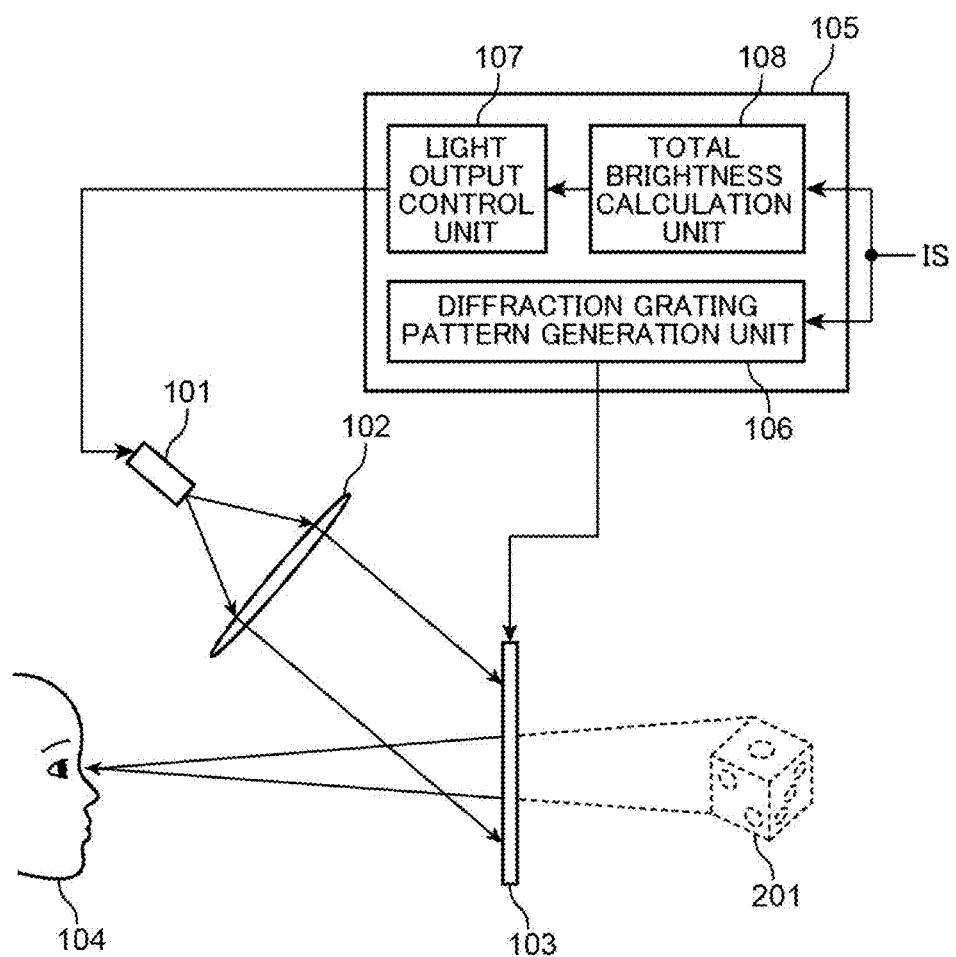
FIG. 1 is a schematic drawing showing a composition of an image display apparatus according to a first embodiment of the present invention.

FIG. 1 is a schematic drawing showing a composition of an image display apparatus according to a first embodiment of the present invention. The image display apparatus shown in FIG. 1 includes a light source 101, an illumination optics system 102, a spatial modulation element 103 and a control circuit 105. In the present embodiment, a computer hologram (CGH) method is used, for example, as a method for displaying an image by diffracting coherent light using a diffraction grating pattern, and a target display image 201 is displayed as a virtual image to an observer 104.

The light source 101 is a laser light source which outputs laser light, as one example of coherent light. For example, a semiconductor laser (laser diode) which outputs laser light of a green wavelength is used as the light source 101. The wavelength of the coherent light is not limited in particular to the example described above, and it is also possible to use another color, or to carry out a black and white display using white light.

The illumination optics system 102 converts the coherent light from the light source 101 into illumination light by changing the wave front shape and intensity distribution of the laser light from the light source 101, and emits this illumination light onto the spatial modulation element 103. For example, it is possible to use a convex lens which converts diffuse laser light into converging light as an illumination optics system 102. The illumination optics system which changes the wave front shape of the illumination light may be a lens or a mirror, or may be an element which is capable of dynamically changing the wave front shape, and the like, as in a liquid crystal lens. Furthermore, the illumination optics system may also include an optics system which changes the intensity distribution.

Furthermore, it is also possible to omit the illumination optics system itself, and in this case, no optical component is arranged between the light source 101 and the spatial modulation element 103, and the space is used directly. In this case, the laser light from the light source 101 is a spherical wave front centered at the light source, and by considering the curvature of this wave front, it is possible to calculate the diffraction grating pattern displayed on the spatial modulation element 103. In this composition, since there are no optical components, then stray light caused by aberration or reflected light, and the like, is not liable to occur and there is an advantage in that a clear image can be obtained.

Here, an input image (input image data) IS is input to the control circuit 105 from an external source, as image data forming an input signal. The input image IS has brightness data or data which enables calculation of the brightness, for all of the pixels which constitute the input image. In the present embodiment, an example is described in which an input image IS is input from a source external to the apparatus, for example, a prescribed image output device or another device via a network, or the like, but the invention is not limited in particular to this example and various modifications can be made, such as generating an input image inside the image display apparatus, and so on.

The spatial modulation element 103 diffracts the illumination light from the illumination optics system 102 by displaying a diffraction grating pattern corresponding to the input image IS. It is possible to use a phase modulation type of reflective liquid crystal panel as the spatial modulation element 103. The spatial modulation element may use another display element, or may use a transmissive type of spatial modulation element, provided that the element can diffract illumination light by displaying a diffraction grating pattern. The transmissive type of spatial modulation element has an advantage in that aberration due to warpage of the element or manufacturing errors is less liable to occur, compared to a reflective type of element, and therefore it is possible to display a stable image.

The control circuit 105 includes a diffraction grating pattern generation unit 106, a light output control unit 107 and a total brightness calculation unit 108. The input image IS is input to the diffraction grating pattern generation unit 106 and the total brightness calculation unit 108. The diffraction grating pattern generation unit 106 causes a diffraction grating pattern corresponding to the input image IS to be displayed on the spatial modulation element 103. The spatial modulation element 103 receives irradiation of illumination light from the illumination optics system 102, and diffracts the illumination light by the diffraction grating pattern. A target display image 201 is displayed by the diffracted light, and an observer 104 perceives a virtual image.

The total brightness calculation unit 108 calculates the sum total of the brightnesses of all of the pixels in the input image IS (total brightness), in frame units, and outputs the result to the light output control unit 107. The light output control unit 107 drives the light source 101 in accordance with the sum total of the brightnesses of all of the pixels in the input image IS, and controls the output light from the light source 101.

More specifically, the light output control unit 107 controls the light source 101 so as to set a higher output of the light source 101, the greater the number of pixels of high brightness and the higher the total brightness in the calculation result from the total brightness calculation unit 108, and so as to set a lower output of the light source 101, the smaller the number of pixels of high brightness and the lower the total brightness. As a result of this, it is possible to make the output of laser light from the light source 101 proportional to the total brightness which is calculated by the total brightness calculation unit 108.

Figure 2:
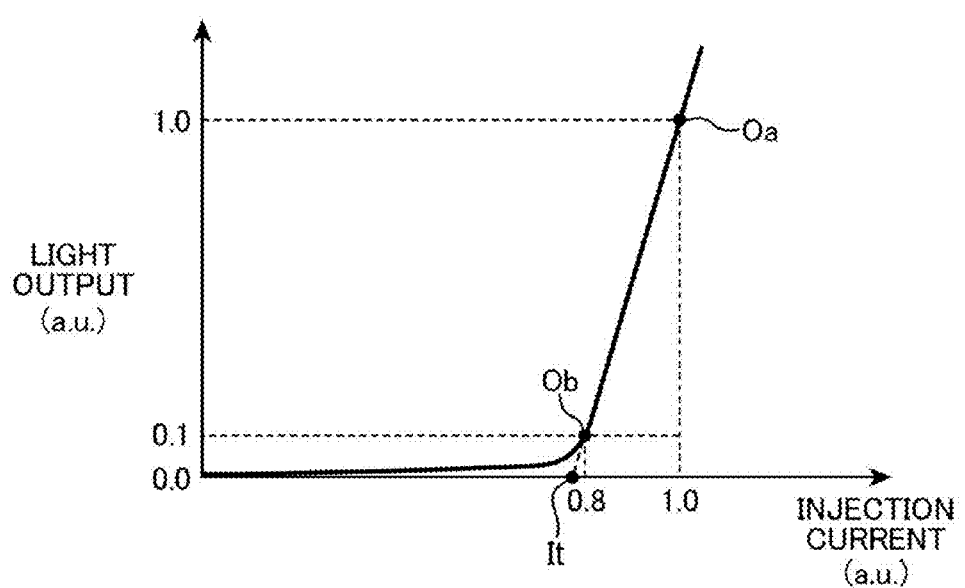
FIG. 2 is a diagram showing a relationship between an injection current to a semiconductor laser and a light output.

For example, if a semiconductor laser is used as the light source 101, then the output of laser light can be controlled by controlling the injection current to the semiconductor laser. FIG. 2 shows a relationship between an injection current to a semiconductor laser and an output of laser light (light output). The term It in the diagram indicates the threshold current of the semiconductor laser.

As shown in FIG. 2, from the operating point Oa to the operating point Ob, the light output is proportional to the injection current, and therefore by means of the light output control unit 107 setting an injection current from the operating point Oa to the operating point Ob, in the light source 101, it is possible to set a desired light output from the maximum light output to one-tenth of the maximum output, in accordance with the total brightness calculated by the total brightness calculation unit 108. Although not shown in the drawings, more precise control of the light output can be achieved by branching the light output of the semiconductor laser and implementing feedback control while monitoring the light output with a light receiving element.

The laser light output control method of the light source 101 is not limited in particular to the example described above, and various modifications are possible. For example, the light output control unit 107 may control the output of the light source 101 in such a manner that a virtual image is displayed at a lower brightness than a reference virtual image displayed when the input image is used directly, if the total brightness in the calculation result from the total brightness calculation unit 108 has decreased. Furthermore, the light output control unit 107 may control the output of the light source 101 in such a manner that a virtual image is displayed at a higher brightness than a reference virtual image displayed when the input image is used directly, if the total brightness in the calculation result from the total brightness calculation unit 108 has increased.

As described above, it is possible to reduce the output of the laser light when the total brightness is no more than a prescribed threshold value, and it is possible to increase the output of the laser light when the total brightness is no less than a prescribed threshold value. By implementing control in such a manner that the total brightness and the output of laser light are not directly proportional in this way, it is possible to respond to larger variations in the total brightness of the target display image, by a relatively small control range of the light emission amount.

Furthermore, in the present embodiment, it is possible to control the lighting period of the light source 101, either instead of the control of the light output described above or in addition to the control of the light output described above. In this case, the light output control unit 107 may control the lighting period of the light source 101 so as to set a longer lighting period of the light source 101, the greater the number of pixels of high brightness and the higher the total brightness in the calculation result from the total brightness calculation unit 108, and so as to set a shorter lighting period of the light source 101, the smaller the number of pixels of high brightness and the lower the total brightness. In this case also, it is possible to make the output of laser light from the light source 101 proportional to the total brightness which is calculated by the total brightness calculation unit 108.

Furthermore, the light output control unit 107 may control the lighting period of the light source 101 in such a manner that a virtual image is displayed at a lower brightness than a reference virtual image displayed when the input image is used directly, if the total brightness in the calculation result from the total brightness calculation unit 108 has decreased. Furthermore, the light output control unit 107 may control the lighting period of the light source 101 in such a manner that a virtual image is displayed at a higher brightness than a reference virtual image displayed when the input image is used directly, if the total brightness in the calculation result from the total brightness calculation unit 108 has increased.

Figure 3:
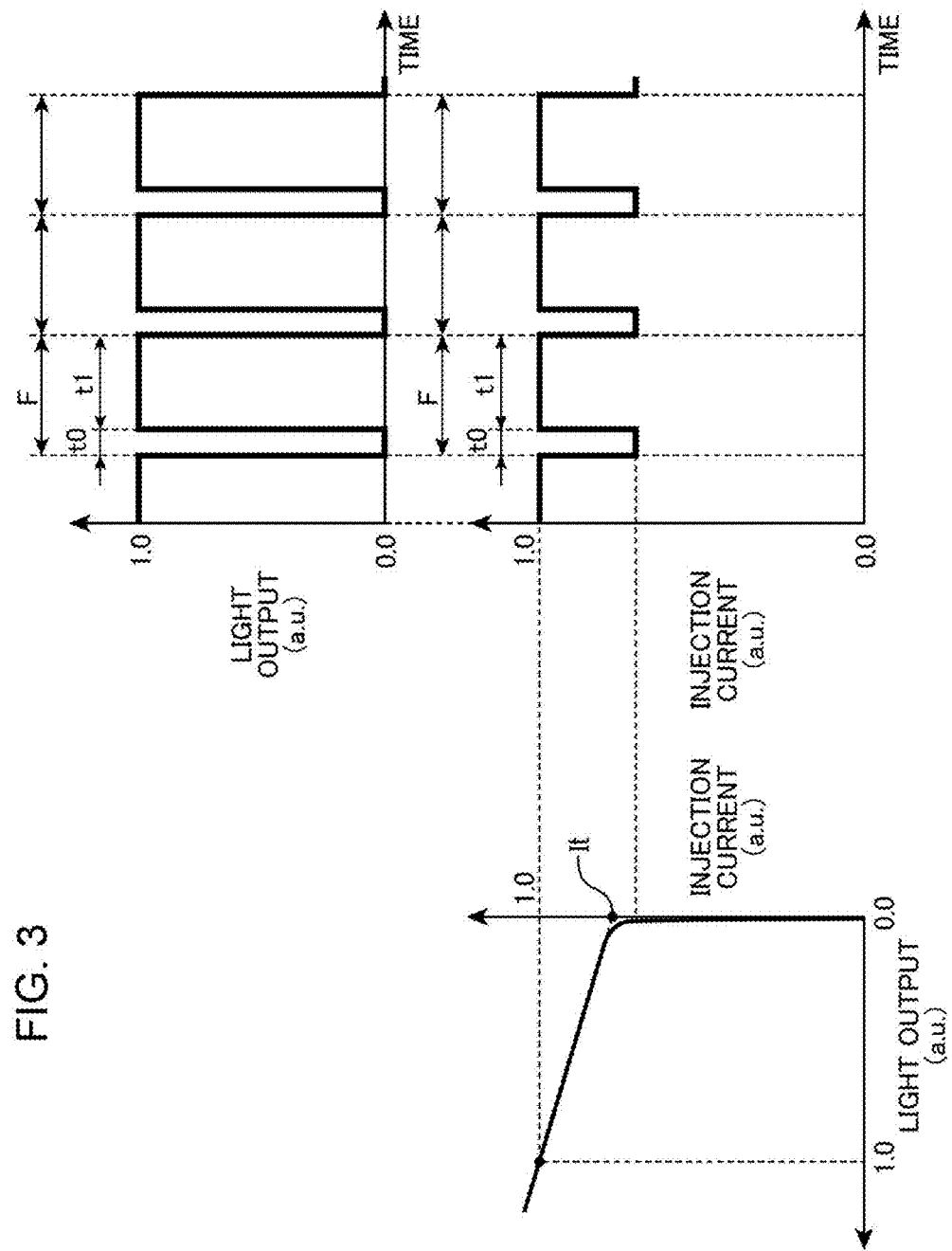
FIG. 3 is a diagram showing a time waveform of the light output and the injection current to the semiconductor laser, and the relationship between the injection current to the semiconductor laser and the light output, when the light output is a maximum.
Figure 4:
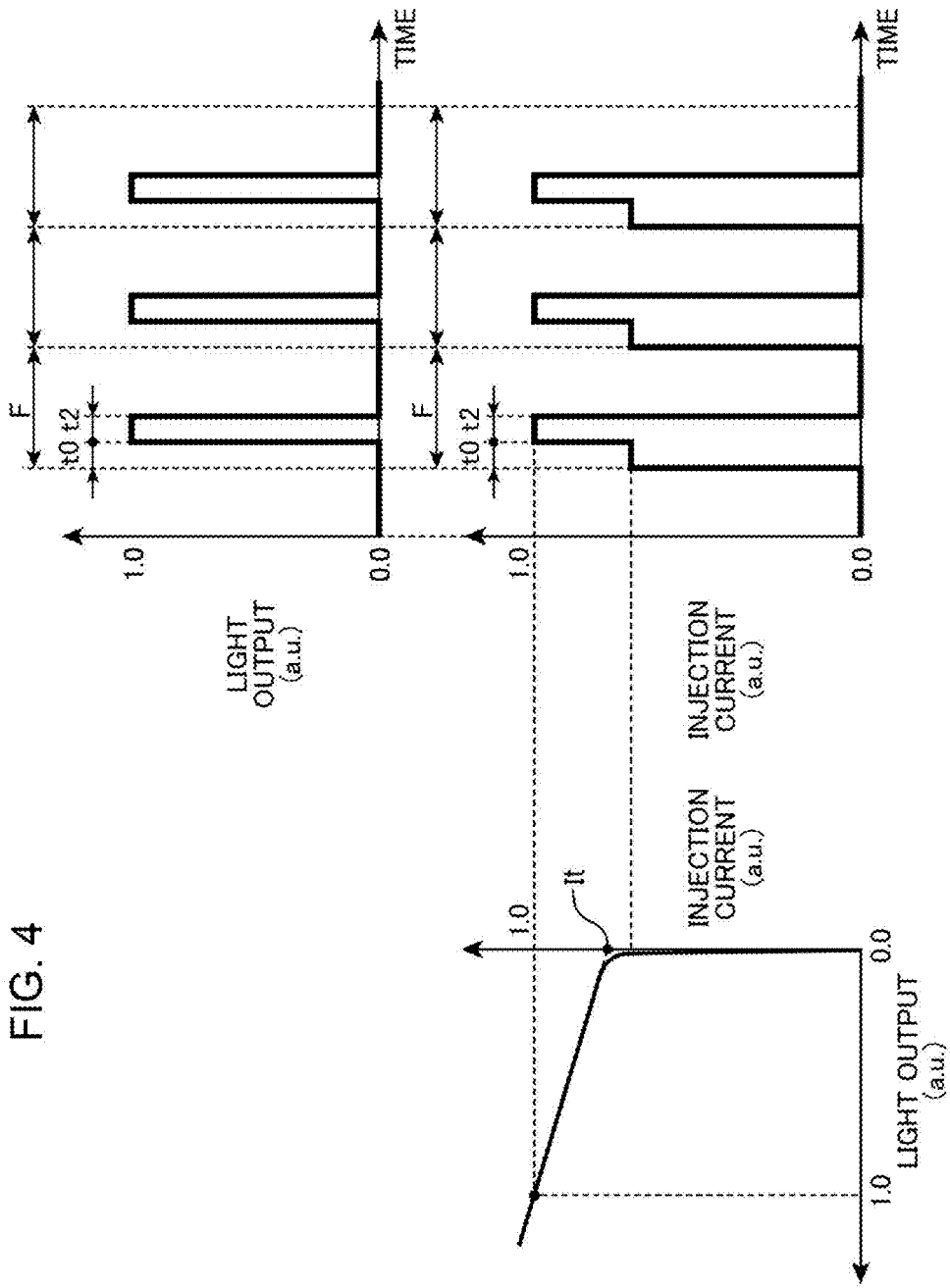
FIG. 4 is a diagram showing a time waveform of the light output and the injection current to the semiconductor laser, and the relationship between the injection current to the semiconductor laser and the light output, when the light output is a one-fifth of maximum output.

For example, if a semiconductor laser is used as the light source 101, then the lighting period of the laser light can be controlled by controlling the injection current to the semiconductor laser. FIG. 3 is a diagram showing a time waveform of the light output and the injection current to the semiconductor laser, and the relationship between the injection current to the semiconductor laser and the light output when the output of the laser light (light output) is a maximum. FIG. 4 is a diagram showing a time waveform of the light output and the injection current to the semiconductor laser, and the relationship between the injection current to the semiconductor laser and the light output when the output of the laser light (light output) is one-fifth of maximum output. F in FIG. 4 indicates one frame period of the input image.

Firstly, when the light output is set to maximum, the light output control unit 107 sets the light source 101 to the injection current shown in the lower part of FIG. 3, whereby, in one frame period F, the extinction time t0 is set initially, whereupon the lighting period t1 is set.

Next, if the light output is set to one-fifth of the maximum output, the light output control unit 107 sets the light source 101 to the injection current shown in the lower part of FIG. 4, whereby, in one frame period F, the extinction time t0 is set initially, whereupon the lighting period t2 is set, the lighting period t2 is one-fifth of the period of the lighting period t1, and the remaining four-fifths of the period (F-t0-t2) is set as an extinction period, and the injection current during this period is 0.

As described above, when obtaining a maximum light output, the light source 101 is extinguished in the period where the spatial modulation element 103 is instable between frames (period t0), thereby preventing destabilization of the image output. Furthermore, by setting the injection current to a value slightly lower than the threshold current It which is the oscillating threshold of the semiconductor laser, in the period where the light source is extinguished between frames (period t0), the rise of the light output at the start of light emission (the starting time of the lighting period t2) becomes sharper. As a result of this, even if a shorter lighting period is set, the lighting period and the light output area are accurately proportional and the dynamic range of the light output control is made greater.

Furthermore, by means of the control of the light emission amount based on the lighting period in this way, it is possible to light up the light source with an injection current which is substantially proportional to the light output, except for the injection current which is initially extinguished between frames, and it is possible to set the injection current to zero in the period (F-t0-t2) after the lighting period. Here, as in the example in FIG. 2, in the case of control of the light emission amount based on the amount of injection current, even if the light emission amount is one-tenth, the injection current is required to be approximately 80% of the current at maximum light emission, and hence even if the light emission amount is reduced, it is not possible to reduce the required current in proportion to the light emission amount. On the other hand, as in the example in FIG. 3 and FIG. 4, with control of the light emission amount based on the lighting period, it is possible to set the injection current to zero after a lighting period proportional to the desired light output has passed, and therefore it is possible to reduce the power consumption of the apparatus in comparison with control of the light emission amount based on the injection current amount.

In the case of both the control of the injection current value and the control of the light period described above, due to the reasons described below, there is a possibility that the dynamic range of the control will be restricted to a limited range. In other words, if the light emission amount is set to an extremely small amount by control of the injection current value, then control is performed in the vicinity of the threshold current of the semiconductor laser, and it may become difficult to obtain the desired light emission power accurately, due to the effects of variation in the ambient temperature, deterioration in the properties of the semiconductor laser, and so on. Furthermore, even if using feedback control, the control accuracy deteriorates due to increase in the effects of stray light, and the like. Similarly, in the case of control of the lighting period, it may be difficult to achieve accurate emission of light at the desired output power, with a very short lighting period, due to blunting of the rise and fall of the light output waveform and ringing effects.

On the other hand, the sum total of the brightness of all of the pixels included in the input image IS varies greatly with the scene, and therefore a large dynamic range is required in control of the light emission amount of the light source in an image display apparatus based on a CGH method. Therefore, the light output control unit 107 may control the light emission amount by simultaneously controlling both the injection current value and the lighting period. In this case, it is possible to control an extremely small light emission amount accurately, if a smaller injection current is set for a short lighting period, and therefore the dynamic range of the control of the light emission amount can be expanded significantly.

Figure 5:
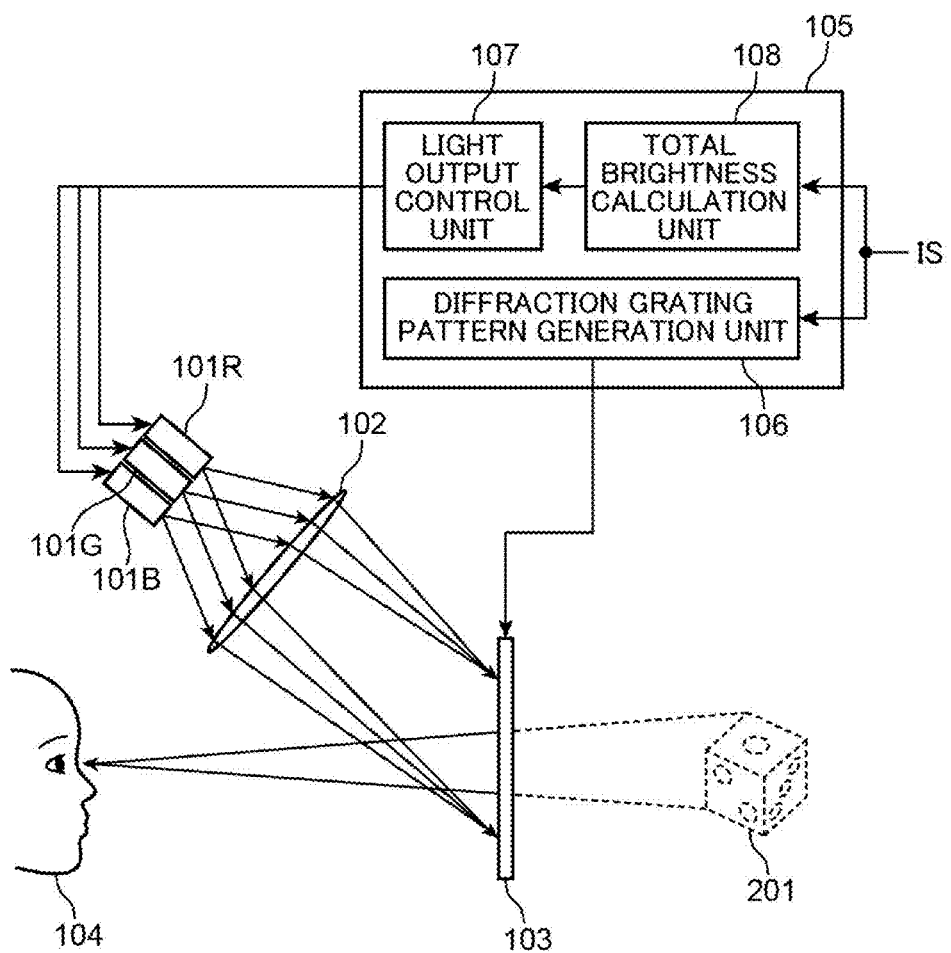
FIG. 5 is a schematic drawing showing a composition of a further image display apparatus according to a first embodiment of the present invention.

FIG. 5 is a schematic drawing showing a composition of a further image display apparatus according to a first embodiment of the present invention. The point of difference of the image display apparatus shown in FIG. 5 with respect to the image display apparatus shown in FIG. 1 is that the light source 101 is changed to a light source 101R which emits laser light of a red color, a light source 101G which emits laser light of a green color, and a light source 101B which emits laser light of a blue color, and the spatial modulation element 103 and the control circuit 105 are operated in accordance with this change.

As shown in FIG. 5, the light source is constituted by light sources of three colors, red, green and blue, namely, the light source 101R, the light source 101G and the light source 101B. The total brightness calculation unit 108 calculates the sum total of the brightnesses of all of the pixels of the input image IS (total brightness), for each color, and outputs the results to the light output control unit 107. The light output control unit 107 respectively controls the light source 101R, the light source 101G and the light source 101B in accordance with the total brightness of each color, similarly to the image display apparatus shown in FIG. 1.

The diffraction grating pattern generation unit 106 causes diffraction grating patterns corresponding to the images of each color in the input image IS to be displayed on the spatial modulation element 103 by time division. The spatial modulation element 103 receives irradiation of illumination light of the respective colors from the illumination optics system 102, and diffracts the illumination light for each color by the diffraction grating patterns. A target display image 201 is displayed in color by the diffracted light for each color, and an observer 104 perceives a virtual image.

As described above, in the present embodiment, the three colors of red, green and blue are driven by time division and processed simultaneously, and the diffraction grating patterns of the images of the respective colors corresponding to the input image IS are displayed on the spatial modulation element 103, whereby a color display can be achieved. Consequently, even in cases where a multi-color display is carried out using a plurality of laser light sources, the total brightness is calculated for the input images of each respective color and the output and/or lighting period of the respective laser lights is controlled is in proportion to the total brightness. As a result of this, it is possible to display a color image at a desired brightness without giving rise to color deviation, in different scenes. In this way, in the present embodiment, it is possible to a provide a display apparatus capable of image display which is free of color deviations, at a uniform brightness, without being affected by variations in the number of pixels of high brightness in the input image.

Furthermore, in the composition in FIG. 5, since the same spatial modulation element 103 is used commonly for laser lights of three colors, then the light source 101R, the light source 101G and the light source 101B are arranged sequentially from top to bottom, for instance, in order of increasing angle of diffraction in the main diffraction direction, in such a manner that the red laser light which has a longer wavelength is diffracted by a larger angle, and the blue laser light which has a shorter wavelength is diffracted by a smaller angle. By adopting a composition of this kind, the directions in which the lights of all of the colors are diffracted substantially coincide with each other and it is possible to achieve a viewing region in which all of the colors can be observed, by means of a simple composition.

(Second Embodiment)

Figure 6:
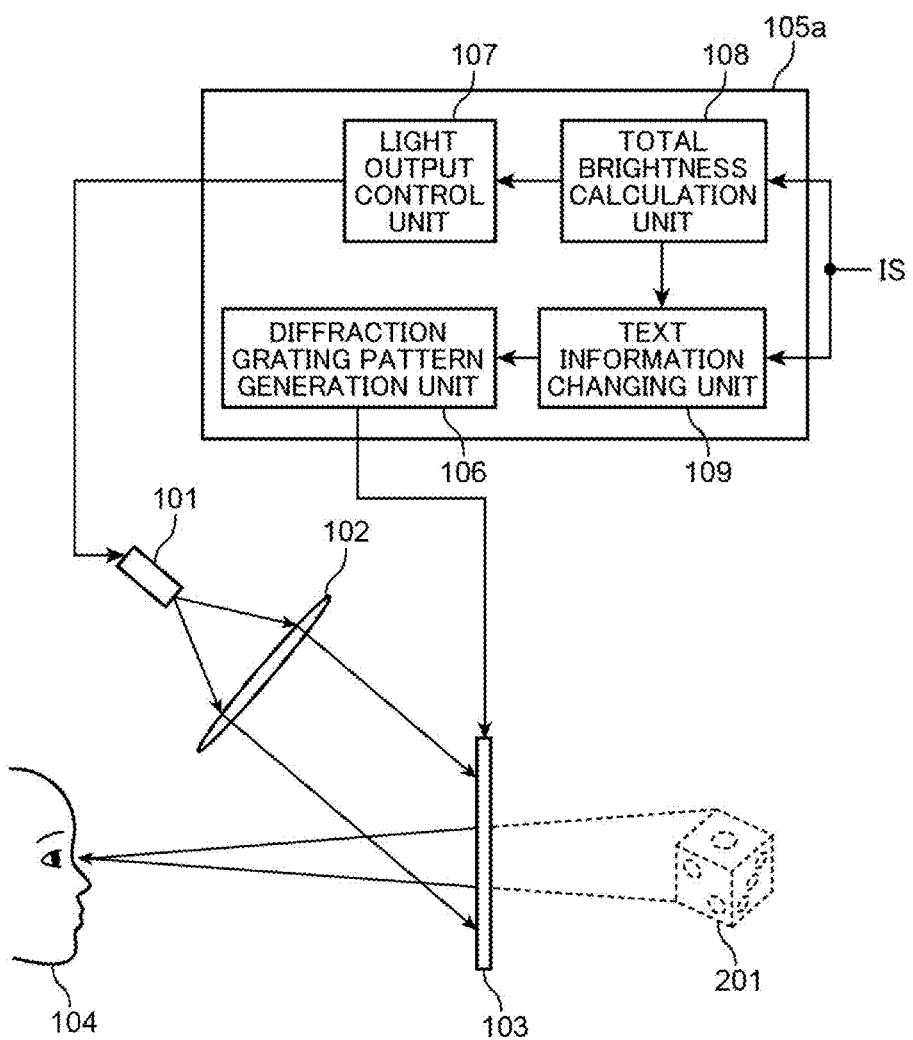
FIG. 6 is a schematic drawing showing a composition of an image display apparatus according to a second embodiment of the present invention.

FIG. 6 is a schematic drawing showing a composition of an image display apparatus according to a second embodiment of the present invention. The points of difference of the image display apparatus shown in FIG. 6 with respect to the image display apparatus shown in FIG. 1 are that the control circuit 105 is changed to a control circuit 105a, and a text information changing unit 109 is added to the control circuit 105a. Points other than these are similar to the image display apparatus shown in FIG. 1 and are not described in detail below, a detailed description being given below only for the points of difference.

Figure 7:
FIG. 7 is a diagram showing one example of an input image in which the number of text characters input to the control circuit shown in FIG. 6 is small.
Figure 8:
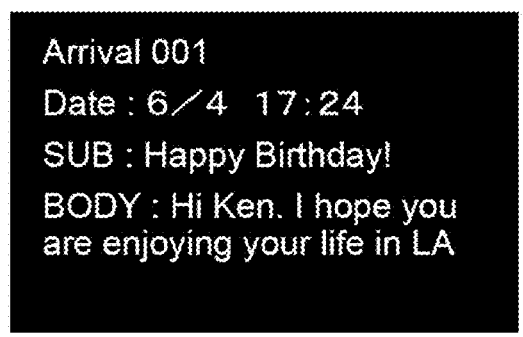
FIG. 8 is a diagram showing one example of an input image in which the number of text characters input to the control circuit shown in FIG. 6 is large.

FIG. 7 is a diagram showing one example of an input image containing a small number of text characters which is input to the control circuit 105a shown in FIG. 6, and FIG. 8 is a diagram showing one example of an input image containing a large number of text characters which is input to the control circuit 105a shown in FIG. 6.

The input image shown in FIG. 7 includes a plurality of text information images which represent text characters, as partial images having a high brightness (a maximum brightness or a brightness that is higher than the average brightness of the input image IS, for example, green or white) (in FIG. 7, the text information images are "N", "e", "w", "WI", "a", "i", "1", "1"), and the image in the other portions is displayed at a low brightness (a minimum brightness or a brightness that is lower than the average brightness of the input image IS, for example, black). The small number of text information images are displayed in a portion of the display region. Furthermore, the input image shown in FIG. 8 includes a plurality of text information images representing text characters (in FIG. 8, "A", . . . , "/", . . . ,"A") as partial images having high brightness, and the image in the other portions is displayed at a low brightness. The large number of text information images are displayed in substantially the whole of the display region. The text information images are not limited in particular to the examples described above, and may include symbols, such as "+" and "Δ", map symbols, pictograms, and various other types of text characters and symbols, provided that they can be displayed in character units.

The total brightness calculation unit 108 calculates a sum total of the brightnesses of all pixels in the input image shown in FIG. 7 or FIG. 8 (total brightness) and outputs the calculation result to the light output control unit 107 and the text information changing unit 109. Here, the light output control unit 107 may control the light source 101 similarly to the first embodiment, but in order to simplify the description, in the present embodiment, it is supposed that normal light source control only is carried out, and the light amount control described above is omitted. When controlling the light source 101 similarly to the first embodiment, the light amount control of the light source 101 is carried out in coordination with the control described below, in such a manner that the brightness of the target display image 201 becomes a desired brightness. Furthermore, the total brightness calculation unit 108 may calculate the number of text information images (number of text characters) rather than the sum total of the brightnesses of all of the pixels of the input image (total brightness) and may output the calculation result to the text information changing unit 109.

The text information changing unit 109 enlarges the plurality of text information images and outputs an input image in which the plurality of text information images are enlarged, to the diffraction grating pattern generation unit 106, when the total brightness calculated by the total brightness calculation unit 108 has decreased, and the diffraction grating pattern generation unit 106 controls the spatial modulation element 103 so as to display a diffraction grating pattern corresponding to the input image in which the plurality of text information images have been enlarged. The spatial modulation element 103 diffracts the illumination light from the illumination optics system 102, by the diffraction grating pattern, and a virtual image in which the plurality of text information images are enlarged is displayed by this diffracted light, whereby a virtual image is displayed at a desired brightness.

More specifically, when the input image shown in FIG. 8 is input, the text information changing unit 109 compares the calculation results of the total brightness calculation unit 108 (the total brightness) with a prescribed reference value (for example, a total brightness when text characters, or the like, are shown in no less than one half of the display region). In this case, since the total brightness exceeds the reference value, then the text information changing unit 109 judges that the total brightness is high, in other words, that the number of text information images (number of displayed text characters) is large, and outputs the input image directly to the diffraction grating pattern generation unit 106. The diffraction grating pattern generation unit 106 in turn controls the spatial modulation element 103 to display a diffraction grating pattern, by using the input image directly. As a result of this, the target display image 201 corresponding to the input image shown in FIG. 8 is displayed at a desired brightness.

Next, when the input image shown in FIG. 7 is input, the text information changing unit 109 compares the calculation results of the total brightness calculation unit 108 (total brightness) with the reference value described above. In this case, the total brightness is lower than the reference value, and therefore the text information changing unit 109 judges that the total brightness has decreased, in other words, the number of text information images (number of displayed text characters) has decreased, and an input image having a changed font size of the text information images is created in such a manner that the font size of the text information images becomes larger.

Figure 9:
FIG. 9 is a diagram showing one example of an input image in which the font size of the text information images is increased.

FIG. 9 is a diagram showing one example of an input image in which the font size of the text information images is increased. By the processing described above, the text information changing unit 109 generates an input image such as that shown in FIG. 9 and outputs this input image to the diffraction grating pattern generation unit 106, and the diffraction grating pattern generation unit 106 controls the spatial modulation element 103 so as to display a diffraction grating pattern corresponding to the input image which has an increased font size.

As a result of this, a virtual image of lower brightness than the reference virtual image displayed when the input image shown in FIG. 7 is used directly (a virtual image displayed using the input image shown in FIG. 9) is displayed as the target display image 201. In this way, a small number of text characters is displayed at the same brightness as the virtual image corresponding to the input image shown in FIG. 8, and the target display image 201 can be displayed at the desired brightness.

As described above, in the input image shown in FIG. 8, the number of text characters is larger, and therefore a greater number of pixels of high brightness is present in the target display image and the brightness of the displayed pixels is lower than in the case of FIG. 7. In order to suppress this change in brightness, in the present embodiment, since the number of text characters is small, then the number of pixels of high brightness is made relatively greater by using a larger font (the input image shown in FIG. 9), and it is possible to reduce change in the brightness of the virtual image due to variation in the number of displayed text characters.

Furthermore, the text information changing unit 109 may change the font size of the text information images so as to make the font size of the text information images smaller when the total brightness has increased, in other words, when the number of text information images (number of displayed text characters) has increased, and output the input image having changed text information images to the diffraction grating pattern generation unit 106. The diffraction grating pattern generation unit 106 controls the spatial modulation element 103 so as to display a diffraction grating pattern corresponding to the input image having changed text information images. In this case, since a virtual image having higher brightness than the reference virtual image displayed when the input image is used directly is shown as the target display image 201, then a large number of text characters are displayed at the same brightness as the virtual image corresponding to the input image shown in FIG. 7, and the target display image 201 can be displayed at the desired brightness.

The method for changing the text information images is not limited in particular to the example described above, and the number of pixels of high brightness can be made relatively greater by changing the font to a bold font, for example. In this case, the text information changing unit 109 changes the font of the text information images so as to make the font of the text information images thicker when the number of text information images has decreased, and outputs the input image having changed text information images to the diffraction grating pattern generation unit 106. The diffraction grating pattern generation unit 106 controls the spatial modulation element 103 so as to display a diffraction grating pattern corresponding to the input image having changed text information images. As a result of this, since a virtual image having lower brightness than the reference virtual image displayed when the input image is used directly is shown as the target display image 201, and a small number of text characters are displayed at the same brightness as the virtual image corresponding to the input image shown in FIG. 8, then the change in the brightness of the display image due to variation in the number of displayed text characters is reduced.

Furthermore, the text information changing unit 109 may change the font of the text information images so as to make the font of the text information images narrower when the number of text information images has increased, and output the input image having changed text information images to the diffraction grating pattern generation unit 106. The diffraction grating pattern generation unit 106 controls the spatial modulation element 103 so as to display a diffraction grating pattern corresponding to the input image having changed text information images. In this case, since a virtual image having higher brightness than the reference virtual image displayed when the input image is used directly is shown as the target display image 201, and a large number of text characters are displayed at the same brightness as the virtual image corresponding to the input image shown in FIG. 7, then the change in the brightness of the display image due to variation in the number of displayed text characters is reduced.

Furthermore, the text information changing unit 109 can change the font size and/or the font of the text information images in the input image in such a manner that the font size of the text information images becomes smaller and/or the font of the text information images becomes narrower, the higher the total brightness, in other words, the greater the number of text information images (the number of displayed text characters), whereas the font size of the text information images becomes larger and/or the font of the text information images becomes thicker, the lower the total brightness, in other words, the smaller the number of text information images (the number of displayed text characters). The text information changing unit 109 outputs the input image having changed text information images to the diffraction grating pattern generation unit 106 and the diffraction grating pattern generation unit 106 controls the spatial modulation element 103 so as to display a diffraction grating pattern corresponding to the input image having changed text information images. In this case, it is possible to display text information images at a uniform brightness, at all times.

Figure 10:
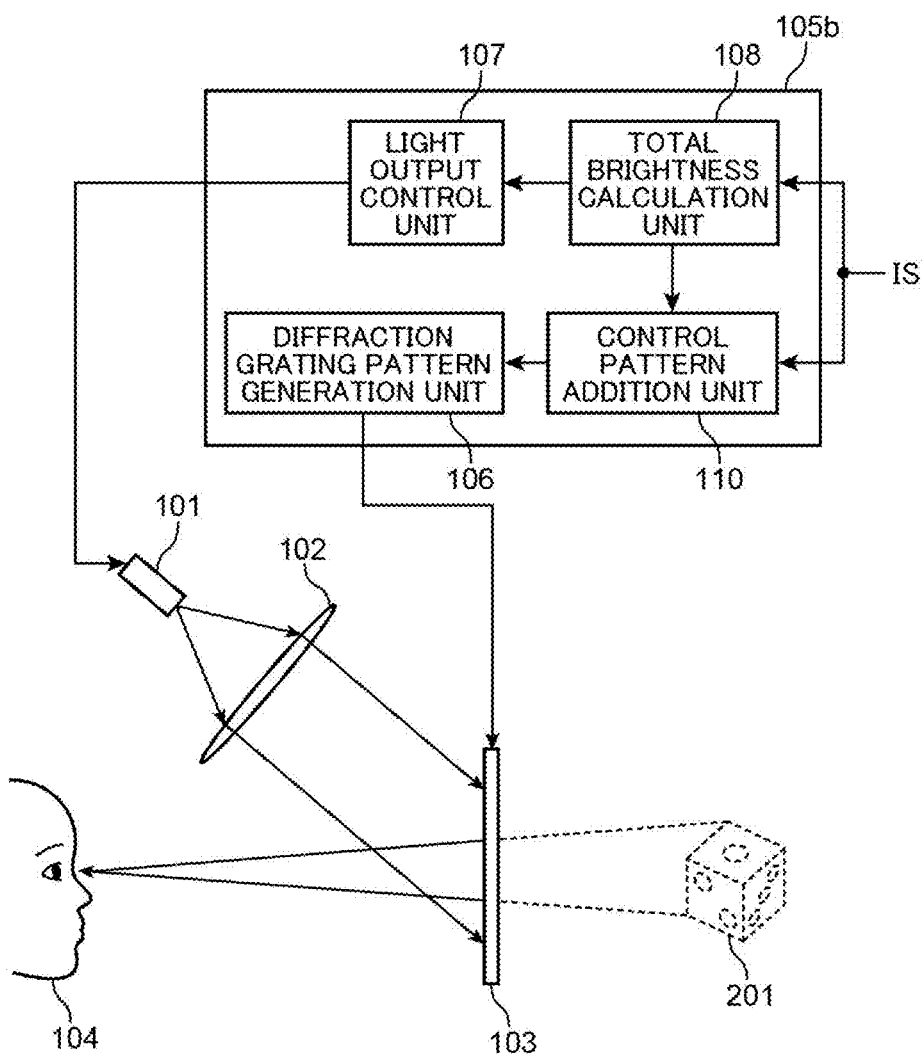
FIG. 10 is a schematic drawing showing a further composition of an image display apparatus according to a second embodiment of the present invention.

FIG. 10 is a schematic drawing showing a further composition of an image display apparatus according to a second embodiment of the present invention. The points of difference of the image display apparatus shown in FIG. 10 with respect to the image display apparatus shown in FIG. 1 are that the control circuit 105 is changed to a control circuit 105b, and a control pattern addition unit 110 is added to the control circuit 105b. Points other than these are similar to the image display apparatus shown in FIG. 1 and are not described in detail below, a detailed description being given below only for the points of difference. The light output control unit 107 may control the light source 101 similarly to the first embodiment, but in order to simplify the description, in the present embodiment, it is supposed that only normal light source control is carried out.

The control pattern addition unit 110 adds a control pattern (described hereinafter) to the input image IS, when the total brightness calculated by the total brightness calculation unit 108 has decreased, and outputs the input image with the added control pattern to the diffraction grating pattern generation unit 106. The diffraction grating pattern generation unit 106 then controls the spatial modulation element 103 so as to display a diffraction grating pattern corresponding to the input image with the added control pattern. The spatial modulation element 103 diffracts the illumination light from the illumination optics system 102, by the diffraction grating pattern, and a target display image 201 having increased brightness is displayed by the diffracted light, whereby a virtual image is displayed at a desired brightness.

More specifically, when the input image shown in FIG. 8 is input, the control pattern addition unit 110 compares the calculation results of the total brightness calculation unit 108 (the total brightness) with a prescribed reference value (for example, a total brightness when text characters, or the like, are shown in no less than one half of the display region). In this case, since the total brightness exceeds the reference value, then the control pattern addition unit 110 judges that the total brightness is high, in other words, that the number of text information images (number of displayed text characters) is large, and outputs the input image directly to the diffraction grating pattern generation unit 106 without adding a control pattern. The diffraction grating pattern generation unit 106 in turn controls the spatial modulation element 103 to display a diffraction grating pattern, by using the input image directly. As a result of this, the target display image 201 corresponding to the input image shown in FIG. 8 is displayed at a desired brightness. In the description given above, an example is described in which a control pattern is not added, but it is also possible to add a control pattern having low brightness or minimum brightness (for example, a black color), and in this case also, it is possible to display a virtual image similar to that described above.

Next, when the input image shown in FIG. 7 is input, the control pattern addition unit 110 compares the calculation results of the total brightness calculation unit 108 (total brightness) with the reference value described above. In this case, since the total brightness is lower than the reference value, then the control pattern addition unit 110 judges that the total brightness has decreased, in other words, than the number of text information images (number of displayed text characters) has decreased, and adds a control pattern to the input image in the form of an external frame pattern of high brightness (for example, a brightness which is higher than an intermediate brightness of the input image IS, or a maximum brightness, such as green or white) which is added about the outer periphery of the input image, the outer frame pattern being changed so as to increase the thickness of the outer frame pattern, whereby an input image in which the outer frame pattern has been added to the input image shown in FIG. 7 is obtained.

Figure 11:
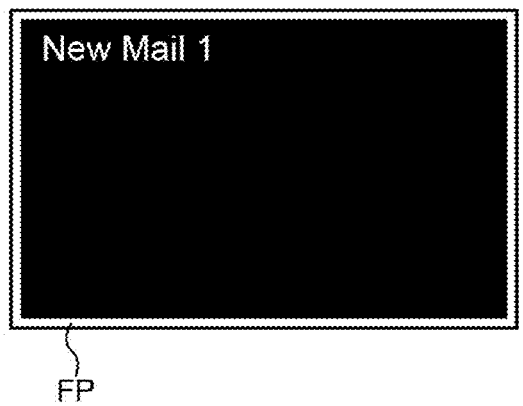
FIG. 11 is a diagram showing one example of an input image created by adding an outer frame pattern to the input image shown in FIG. 7.

FIG. 11 is a diagram showing one example of an input image created by adding an outer frame pattern to the input image shown in FIG. 7. By the processing described above, the control pattern addition unit 110 generates an input image such as that shown in FIG. 11 and outputs this input image to the diffraction grating pattern generation unit 106, and the diffraction grating pattern generation unit 106 controls the spatial modulation element 103 so as to display a diffraction grating pattern corresponding to the input image having an added quadrilateral outer frame pattern FP of high brightness (for example, green or white). As a result of this, a virtual image of lower brightness than the reference virtual image displayed when the input image shown in FIG. 7 is used directly (a virtual image displayed using the input image shown in FIG. 11) is displayed as the target display image 201. In this way, a small number of text characters is displayed at the same brightness as the virtual image corresponding to the input image shown in FIG. 8, and the target display image 201 can be displayed at the desired brightness.

Furthermore, the control pattern addition unit 110 may change the outer frame pattern FP so as to reduce the thickness of the outer frame pattern FP when the total brightness has increased, in other words, when the number of text information images (number of displayed text characters) has increased, and output the input image having a changed outer frame pattern FP to the diffraction grating pattern generation unit 106. The diffraction grating pattern generation unit 106 controls the spatial modulation element 103 so as to display a diffraction grating pattern corresponding to the input image having a changed outer frame pattern FP. In this case, since a virtual image having higher brightness than the reference virtual image displayed when the input image is used directly is shown as the target display image 201, then a large number of text characters are displayed at the same brightness as the virtual image corresponding to the input image shown in FIG. 11, and the target display image 201 can be displayed at the desired brightness.

By means of the processing described above, in the present embodiment, an outer frame pattern FP is added to the outer peripheral portion of an input image, as shown in FIG. 11, and when the number of text characters is small, a thicker frame is displayed and a relatively large number of pixels of high brightness are displayed, thereby making it possible to diminish changes in the brightness of the virtual image due to variations in the number of text characters displayed.

Here, an example is described in which the thickness of the frame is changed, but it is also possible to change the brightness depending on the number of text characters, while using a frame pattern of the same thickness. Furthermore, apart from an outer frame pattern, it is also possible to change the thickness or brightness of the pattern, similarly to the description above, by means of an underline pattern, or in the lines at the top and bottom of the screen only, or in the lines on the left and right-hand sides of the screen only.

For instance, when changing the brightness of the outer frame pattern, the control pattern addition unit 110 changes the outer frame pattern so as to increase the brightness of the outer frame pattern, when the total brightness has decreased, in other words, when the number of text information images has decreased, and outputs an input image to which this outer frame pattern has been added, to the diffraction grating pattern generation unit 106. The diffraction grating pattern generation unit 106 controls the spatial modulation element so as to display a diffraction grating pattern corresponding to the input image with the added outer frame pattern. As a result of this, a virtual image which is of lower brightness than the reference virtual image displayed when the input image is used directly, is displayed as the target display image 201. In this way, a small number of text characters can be displayed at the same brightness as the virtual image corresponding to the input image shown in FIG. 8, and therefore it is possible to reduce change in the brightness of the virtual image due to variation in the number of displayed text characters.

Furthermore, the control pattern addition unit 110 may change the outer frame pattern so as to reduce the brightness of the outer frame pattern when the total brightness has increased, in other words, when the number of text information images (number of displayed text characters) has increased, and output the input image having a changed outer frame pattern to the diffraction grating pattern generation unit 106. The diffraction grating pattern generation unit 106 controls the spatial modulation element 103 so as to display a diffraction grating pattern corresponding to the input image having a changed outer frame pattern. In this case, since a virtual image having higher brightness than the reference virtual image displayed when the input image is used directly is shown as the target display image 201, then a large number of text characters are displayed at the same brightness as the virtual image corresponding to the input image shown in FIG. 11, and the target display image 201 can be displayed at the desired brightness.

Furthermore, the control pattern addition unit 110 may change the outer frame pattern so as to reduce the thickness of the outer frame pattern or so as to reduce the brightness of the outer frame pattern, the higher the total brightness, in other words, the greater the number of text information images (number of displayed text characters), and so as to increase the thickness of the outer frame pattern or so as to increase the brightness of the outer frame pattern, the lower the total brightness, in other words, the smaller the number of text information images (number of displayed text characters). The control pattern addition unit 110 outputs the input image having an added outer frame pattern to the diffraction grating pattern generation unit 106, and the diffraction grating pattern generation unit 106 controls the spatial modulation element 103 so as to display a diffraction grating pattern in accordance with the input image having an added outer frame pattern. In this case, it is possible to display text information images at a uniform brightness, at all times.

Figure 12:
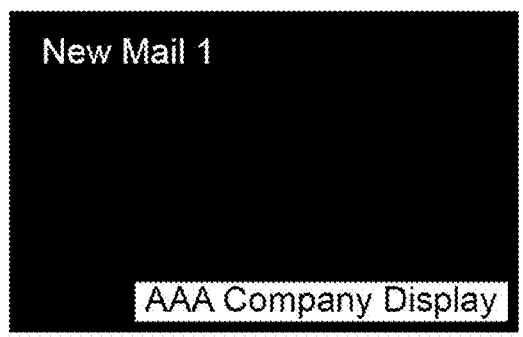
FIG. 12 is a diagram showing one example of an input image to which a text string image has been added as a control pattern, when the number of text characters is small.
Figure 13:
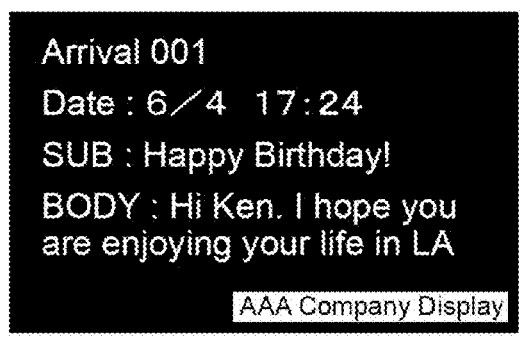
FIG. 13 is a diagram showing one example of an input image to which a text string image has been added as a control pattern, when the number of text characters is large.

Furthermore, the control pattern is not limited in particular to the example described above and various modifications can be applied. For example, it is possible to add a text string image including a prescribed text string relating to the image display apparatus, such as a unique logo pattern, to the input image (the text string image is, for instance, an image with a background of high brightness or maximum brightness, such as green or white, in which the text string has a low brightness or minimum brightness, such as black), the size and brightness of the text string image being varied in accordance with the number of text characters. FIG. 12 is a diagram showing one example of an input image to which a text string image is added as a control pattern, when the number of text characters is small, and FIG. 13 is a diagram showing one example of an input image to which a text string image is added as a control pattern when the number of text characters is large.

For example, when the input image shown in FIG. 8 is input, the control pattern addition unit 110 compares the calculation results of the total brightness calculation unit 108 (the total brightness) with a prescribed reference value (for example, a total brightness when text characters, or the like, are shown in no less than one half of the display region). In this case, since the total brightness is greater than the reference value, then the control pattern addition unit 110 judges that the total brightness has increased, in other words, that the number of text information images (number of displayed text characters) has increased, adds a text string image to the input image, and changes the text string image so as to make the text string image smaller, thereby generating an input image such as that shown in FIG. 13, which is output to the diffraction grating pattern generation unit 106. The diffraction grating pattern generation unit 106 controls the spatial modulation element 103 so as to display a diffraction grating pattern corresponding to an input image in which a small text string image forming a logo mark is added in the lower part, and hence the target display image 201 is displayed at a desired brightness.

Next, when the input image shown in FIG. 7 is input, the control pattern addition unit 110 compares the calculation results of the total brightness calculation unit 108 (total brightness) with the reference value described above. In this case, since the total brightness is less than the reference value, then the control pattern addition unit 110 judges that the total brightness has decreased, in other words, that the number of text information images (number of displayed text characters) has decreased, and changes the text string image so as to make the text string image larger, thereby generating an input image such as that shown in FIG. 12, which is output to the diffraction grating pattern generation unit 106. The diffraction grating pattern generation unit 106 controls the spatial modulation element 103 so as to display a diffraction grating pattern corresponding to the input image to which a large text string image has been added. As a result of this, a virtual image (a virtual image displayed by using the input image shown in FIG. 12) is displayed as the target display image 201 at a brightness which is lower than the reference virtual image displayed when the input image shown in FIG. 7 is used directly, a small number of text characters is displayed at the same brightness as the virtual image corresponding to the input image shown in FIG. 13, and the target display image 201 can be displayed at a desired brightness.

In the example described above, the size of the text string image is changed, but the invention is not limited to this example, and it is also possible to change the brightness of the text string image. For example, if the text string image is an image having a background of intermediate brightness, for example, a green or gray image of intermediate brightness, and having a text string of low brightness or minimum brightness, such as a black image, then the control pattern addition unit 110 changes the text string image so as to increase the brightness of the background of the text string image when the total brightness has decreased, in other words, when the number of text information images has decreased, and outputs an input image to which this text string image has been added, to the diffraction grating pattern generation unit 106. The diffraction grating pattern generation unit 106 controls the spatial modulation element 103 so as to display a diffraction grating pattern corresponding to the input image to which the text string image has been added. In this case, a virtual image having a lower brightness than a reference virtual image displayed when the input image is used directly, is displayed as the target display image 201, and it is possible to display a small number of text characters at the same brightness as a virtual image corresponding to an input image having a large number of text characters, to which a text string image of reduced brightness has been added.

Furthermore, the control pattern addition unit 110 changes the text string image so as to reduce the brightness of the background of the text string image when the total brightness has increased, in other words, when the number of text information images has increased, and outputs the input image to which this text string image has been added, to the diffraction grating pattern generation unit 106. The diffraction grating pattern generation unit 106 controls the spatial modulation element 103 so as to display a diffraction grating pattern corresponding to the input image to which the text string image has been added. In this case, a virtual image having a higher brightness than a virtual image displayed using an input image to which a text string image before brightness reduction has been added, is displayed as the target display image 201, and it is possible to display a large number of text characters at the same brightness as a virtual image corresponding to an input image having a small number of text characters, to which a text string image of increased brightness has been added. As a result of this, change in the brightness of the virtual image due to variation in the number of displayed text characters can be reduced, and the target display image 201 can be displayed at a desired brightness.

Furthermore, the control pattern addition unit 110 may change the text string image so as to make the text string image smaller or so as to reduce the brightness of the text string image, the higher the total brightness, in other words, the greater the number of text information images (number of displayed text characters), and so as to make the text string image larger or so as to increase the brightness of the text string image, the lower the total brightness, in other words, the smaller the number of text information images (number of displayed text characters). The control pattern addition unit 110 outputs the input image having the added text string image to the diffraction grating pattern generation unit 106, and the diffraction grating pattern generation unit 106 controls the spatial modulation element 103 so as to display a diffraction grating pattern in accordance with the input image having the added text string image. In this case, it is possible to display text information images at a uniform brightness, at all times.

Figure 14:
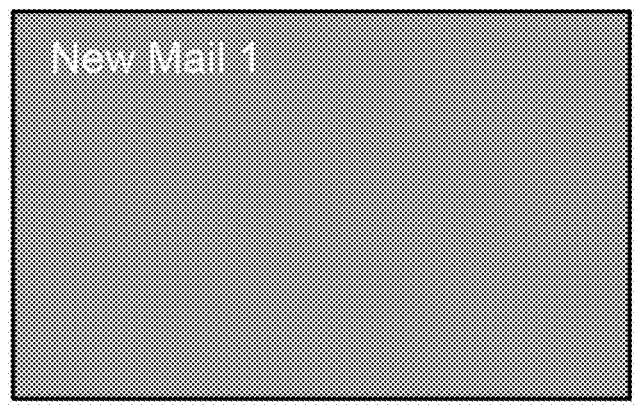
FIG. 14 is a diagram showing one example of an input image to which a uniform pattern has been added as a control pattern, when the number of text characters is small.

Furthermore, it is also possible to add a uniform pattern having a uniform brightness (for example, an intermediate brightness of the input image) with respect to whole of the input image, as the control pattern, and to vary the brightness of this uniform pattern. FIG. 14 is a diagram showing one example of an input image to which a uniform pattern has been added as a control pattern, when the number of text characters is small.

When the input image shown in FIG. 8 is input, the control pattern addition unit 110 compares the calculation results of the total brightness calculation unit 108 (the total brightness) with a prescribed reference value (for example, a total brightness when text characters, or the like, are shown in no less than one half of the display region). In this case, since the total brightness exceeds the reference value, then the control pattern addition unit 110 judges that the total brightness is high, in other words, that the number of text information images (number of displayed text characters) is large, and outputs the input image directly to the diffraction grating pattern generation unit 106 without adding the uniform pattern. The diffraction grating pattern generation unit 106 in turn controls the spatial modulation element 103 to display a diffraction grating pattern, by using the input image directly, and a target display image 201 corresponding to the input image shown in FIG. 8 is displayed at the desired brightness. In the description given above, an example is described in which a uniform pattern is not added, but it is also possible to add a uniform pattern having low brightness or minimum brightness (for example, a black color), and in this case also, it is possible to display a virtual image similar to that described above.

Next, when the input image shown in FIG. 7 is input, the control pattern addition unit 110 compares the calculation results of the total brightness calculation unit 108 (total brightness) with the reference value described above. In this case, since the total brightness is less than the reference value, then the control pattern addition unit 110 judges that the total brightness has decreased, in other words, that the number of text information images (number of displayed text characters) has decreased, and changes the brightness of the uniform pattern so as to increase the brightness of the uniform pattern, thereby generating an input image such as that shown in FIG. 14, which is output to the diffraction grating pattern generation unit 106. The diffraction grating pattern generation unit 106 controls the spatial modulation element 103 so as to display a diffraction grating pattern corresponding to the input image to which a uniform pattern has been added. As a result of this, a virtual image (a virtual image displayed by using the input image shown in FIG. 14) is displayed as the target display image 201 at a brightness which is lower than the reference virtual image displayed when the input image shown in FIG. 7 is used directly, a small number of text characters is displayed at the same brightness as the virtual image corresponding to the input image shown in FIG. 8, and the target display image 201 can be displayed at a desired brightness.

Furthermore, the control pattern addition unit 110 may change the brightness of the uniform pattern so as to reduce the brightness of the uniform pattern, the higher the total brightness, in other words, the greater the number of text information images (number of displayed text characters), and so as to increase the brightness of the uniform pattern, the lower the total brightness, in other words, the smaller the number of text information images (number of displayed text characters). The control pattern addition unit 110 outputs the input image having the added uniform pattern to the diffraction grating pattern generation unit 106, and the diffraction grating pattern generation unit 106 controls the spatial modulation element 103 so as to display a diffraction grating pattern in accordance with the input image having the added uniform pattern. In this case, it is possible to display text information images at a uniform brightness, at all times.

Figure 15:
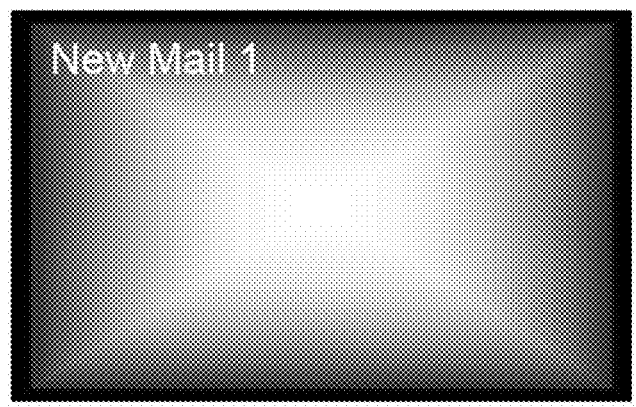
FIG. 15 is a diagram showing one example of an input image to which a distributed pattern has been added as a control pattern, when the number of text characters is small.

Furthermore, it is also possible to use a distributed pattern which is distributed with respect to the whole of the input image, the brightness in peripheral portions thereof being lower than the brightness in a central portion of the input image. FIG. 15 is a diagram showing one example of an input image to which a distributed pattern has been added as a control pattern, when the number of text characters is small.

When the input image shown in FIG. 8 is input, the control pattern addition unit 110 compares the calculation results of the total brightness calculation unit 108 (the total brightness) with a prescribed reference value (for example, a total brightness when text characters, or the like, are shown in no less than one half of the display region). In this case, since the total brightness exceeds the reference value, then the control pattern addition unit 110 judges that the total brightness is high, in other words, that the number of text information images (number of displayed text characters) is large, and outputs the input image directly to the diffraction grating pattern generation unit 106 without adding the distributed pattern. The diffraction grating pattern generation unit 106 in turn controls the spatial modulation element 103 to display a diffraction grating pattern, by using the input image directly, and a target display image 201 corresponding to the input image shown in FIG. 8 is displayed at the desired brightness. In the description given above, an example is described in which a distributed pattern is not added, but it is also possible to add a distributed pattern having low brightness or minimum brightness (for example, a pattern which changes to black in the center), and in this case also, it is possible to display a virtual image similar to that described above.

Next, when the input image shown in FIG. 7 is input, the control pattern addition unit 110 compares the calculation results of the total brightness calculation unit 108 (total brightness) with the reference value described above. In this case, since the total brightness is less than the reference value, then the control pattern addition unit 110 judges that the total brightness has decreased, in other words, that the number of text information images (number of displayed text characters) has decreased, and changes the brightness of the distributed pattern so as to increase the brightness of the central portion of the distributed pattern, thereby generating an input image such as that shown in FIG. 15, which is output to the diffraction grating pattern generation unit 106. The diffraction grating pattern generation unit 106 controls the spatial modulation element 103 so as to display a diffraction grating pattern corresponding to the input image to which a distributed pattern has been added.

As a result of this, a virtual image (a virtual image displayed by using the input image shown in FIG. 15) is displayed as the target display image 201 at a brightness which is lower than the reference virtual image displayed when the input image shown in FIG. 7 is used directly, a small number of text characters is displayed at the same brightness as the virtual image corresponding to the input image shown in FIG. 8, and the target display image 201 can be displayed at a desired brightness. Furthermore, since a distributed pattern such as that shown in FIG. 15 has no outlines in the peripheral portion, then it has beneficial effects in that the distributed pattern portion of the virtual image is not readily visible to the observer.

Furthermore, the control pattern addition unit 110 may change the brightness of the distributed pattern so as to reduce the brightness of the central portion of the distributed pattern, the higher the total brightness, in other words, the greater the number of text information images (number of displayed text characters), and so as to increase the brightness of the central portion of the distributed pattern, the lower the total brightness, in other words, the smaller the number of text information images (number of displayed text characters). The control pattern addition unit 110 outputs the input image having the added distributed pattern to the diffraction grating pattern generation unit 106, and the diffraction grating pattern generation unit 106 controls the spatial modulation element 103 so as to display a diffraction grating pattern in accordance with the input image having the added distributed pattern. In this case, it is possible to display text information images at a uniform brightness, at all times.

As described above, in the present embodiment, the sum total of the brightnesses of all pixels in the input image (total brightness) is calculated, and the brightness or size, etc., of a control pattern can be controlled in accordance with the sum total of the brightnesses of the pixels in the input image, by controlling the light output of the light source 101 in accordance with the total brightness or by adding a control pattern such as a logo mark or outer frame, or the like, to the input image.

Furthermore, the method of adding and displaying a control display pattern described in the present embodiment can also be combined with the method of controlling the light output and/or the lighting period of the light source, as described in the first embodiment. In this case, the light output control unit 107 controls the light source 101 similarly to the first embodiment, in coordinated fashion with the control described above, in such a manner that the brightness of the target display image 201 assumes a desired brightness. As a result of this, the control range (dynamic range) of the light output and/or switching period of the light source is reduced and more stable control of the brightness can be achieved.

Furthermore, with a combination of control of the light output and/or the lighting period and control by adding a control pattern, it is possible to set the control pattern as a fixed pattern and to add a pattern having a uniform brightness, regardless of the number of displayed text characters. In this case also, the minimum brightness of the target display image is increased by an amount corresponding to the brightness of the control pattern, the control width (dynamic range) of the light output and/or switching period of the light source is reduced, and more stable control of the brightness can be achieved. Moreover, since the control pattern is not changed, a beneficial effect is obtained in that the observer is not liable to experience a sense of incongruity.

Furthermore, the respective examples given above were described in relation to a method which additionally displays a control pattern when the input image is text information, but such a method is also effective when the input image is image information. The pattern brightness and thickness, etc., was changed in the various patterns described above, but it is also possible to extinguish the pattern when the number of text characters is large.

(Third Embodiment)

Figure 16:
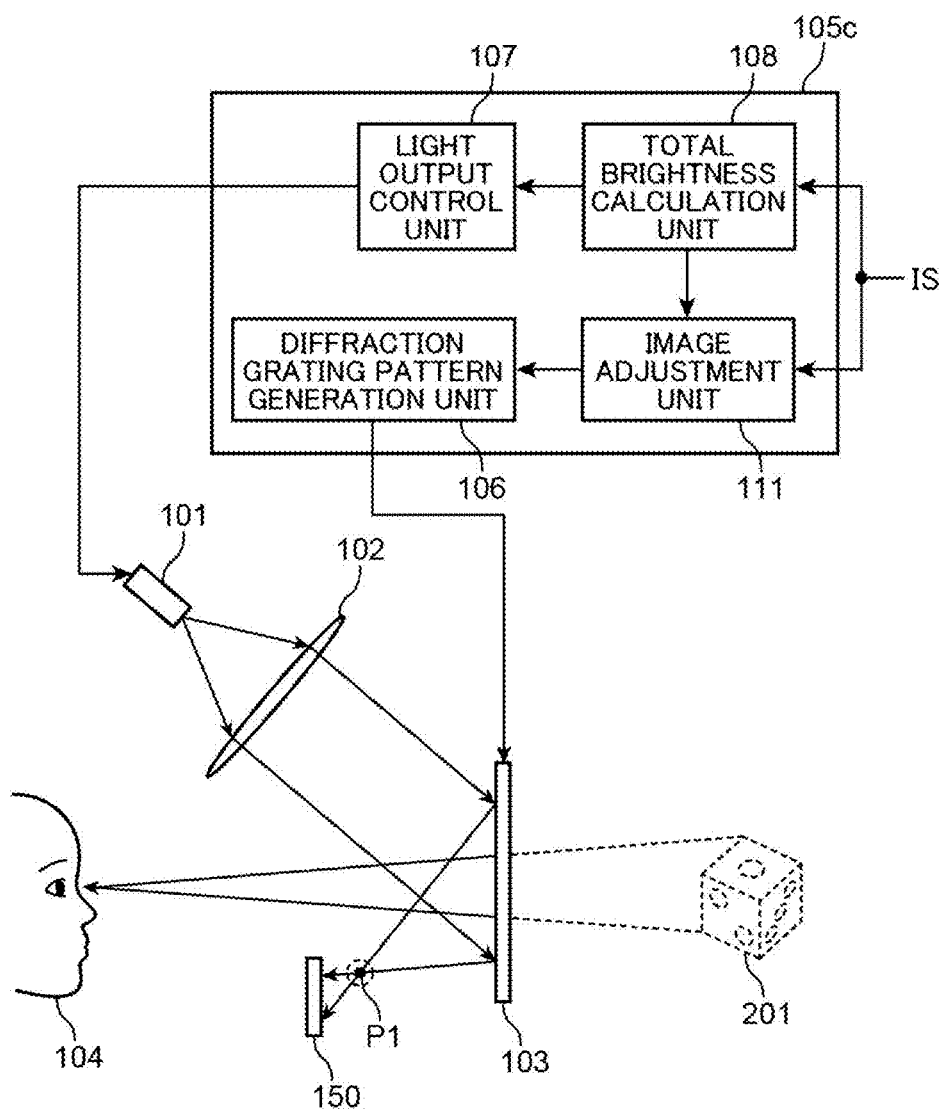
FIG. 16 is a schematic drawing showing a composition of an image display apparatus according to a third embodiment of the present invention.

FIG. 16 is a schematic drawing showing a composition of an image display apparatus according to a third embodiment of the present invention. Constituent elements of the image display apparatus shown in FIG. 16 which are the same as the image display apparatus shown in FIG. 1 are not described here.

The characteristic features of the image display apparatus in FIG. 16 are that the control circuit 105 shown in FIG. 1 is changed to a control circuit 105c, an image adjustment unit 111 is added to the control circuit 105c, and a light shielding section 150 which shields a portion of the light emitted from the spatial modulation element 103 is added. The image adjustment unit 111 adds a light shielding pattern which generates light directed towards the light shielding section 150, to the input image IS, and outputs the image to the diffraction grating pattern generation unit 106. The diffraction grating pattern generation unit 106 controls the spatial modulation element 103 so as to display a diffraction grating pattern corresponding to the input image to which the light shielding pattern has been added. The light output control unit 107 operates similarly to the second embodiment, and in order to simplify the description, it is supposed that only normal light source control is carried out in the present embodiment.

The image display apparatus shown in FIG. 16 is composed in such a manner that the light directed at the light shielding section 150 is directed towards one point P1 which is situated to the front side of the spatial modulation element 103 (on the side of the observer 104). This corresponds to adding a dot-shaped control display pattern situated at one point P1 in front of the spatial modulation element 103, to the target display image 201.

By means of the composition described above, the image adjustment unit 111 changes the light shielding pattern in accordance with the total brightness calculated by the total brightness calculation unit 108 and adds this light shielding pattern to the input image IS, and the spatial modulation element 103 displays a diffraction grating pattern on which a light shielding pattern that diffracts and generates light directed towards the light shielding section 150 is superimposed.

More specifically, if the target display image 201 includes a large number of points of high brightness, in other words, if the total brightness calculated by the total brightness calculation unit 108 has increased, then the image adjustment unit 111 adds a light shielding pattern which reduces the light directed towards the light shielding section 150, to the input image IS, and outputs the image to the diffraction grating pattern generation unit 106. The diffraction grating pattern generation unit 106 controls the spatial modulation element 103 so as to display a diffraction grating pattern corresponding to the input image to which the light shielding pattern has been added, and the spatial modulation element 103 displays a diffraction grating pattern which further reduces the light directed towards the light shielding section 150.

On the other hand, if the number of points of high brightness in the target display image 201 is small, in other words, if the total brightness calculated by the total brightness calculation unit 108 has decreased, then the image adjustment unit 111 adds a light shielding pattern which increases the light directed towards the light shielding section 150, to the input image IS, and outputs the image to the diffraction grating pattern generation unit 106. The diffraction grating pattern generation unit 106 controls the spatial modulation element 103 so as to display a diffraction grating pattern corresponding to the input image to which the light shielding pattern has been added, and the spatial modulation element 103 displays a diffraction grating pattern which further increases the light directed towards the light shielding section 150.

By means of the operation described above, in the present embodiment, the amount of light which is shielded by the light shielding section 150 and is not seen by the observer is increased when the total brightness has decreased, and therefore a virtual image is displayed as a target display image 201 at a brightness which is lower than the reference virtual image displayed when the input image is used directly. As a result of this, brightness changes occurring in the target display image 201 are suppressed and a virtual image can be displayed at a desired brightness, without being affected by variations in the number of pixels of high brightness in the input image.

In FIG. 16, an example is described in which the light shielding pattern is a point light source situated in front of the spatial modulation element 103, but the light shielding pattern may also be on the same side of the spatial modulation element 103 as the target display image 201, or may be any pattern other than a point light source. A composition in which a light shielding pattern is situated on the side of the observer is advantageous in that the size of the light shielding section 150 may be small.

Furthermore, desirably, light which is generated by the light shielding pattern and is directed towards the light shielding section 150 is zero-order light which is not diffracted by the spatial modulation element 103. Furthermore, the light directed towards the light shielding section 150 may also be a prescribed pattern which does not change with the total brightness of the target display image.

FIG. 17 is a schematic drawing showing a further composition of an image display apparatus according to a third embodiment of the present invention. The points of difference of the image display apparatus shown in FIG. 17 with respect to the image display apparatus shown in FIG. 16 are that a frame body 160 is added and a portion of the frame body 160 functions as a light shielding section 150. Points other than these are similar to the image display apparatus shown in FIG. 16 and are not described in detail below, a detailed description being given below only for the points of difference.

Conventionally, in an image display apparatus, unwanted diffracted light occurs in accordance with the pixel pitch of the spatial modulation element and scattered light occurs from soiling on the surface of the optical elements of the illumination optics system, and the like, and from the holding members which hold the optical elements, and so on. The image display apparatus shown in FIG. 17 is composed in such a manner that, principally, the light source 101, the illumination optics system 102, the spatial modulation element 103, and the like, are covered with a light shielding frame body 160, in such a manner that observation of a virtual image is performed through an observation window 161 which is provided in the frame body 160.

More specifically, the frame body 160 is formed in a substantial parallelepiped shape, a substantially rectangular observation window 161 is formed in one surface of the frame body 160 on the side of the observer 104, and a lower side portion of the observation window 161 constitutes a light shielding section 150. In this way, by constituting the light shielding section 150 from a portion of the frame body 160, it is possible to form a light shielding section 150 by means of a simple composition.

Furthermore, with respect to the arrangement of the light shielding section 150, as in FIG. 17, the light shielding section 150 is desirably arranged in the vicinity of the direction of travel of the light RL which arises from incident light IL on the spatial modulation element 103 which is reflected rather than being diffracted by the spatial modulation element 103. In this arrangement, the light shielding section 150 is simultaneously able to shield the reflected light RL at the spatial modulation element 103, also, and therefore image display having little noise becomes possible, using a simpler composition.

Beneficial effects in suppressing change in brightness due to variation in the input image have been described above, but the brightness control method described in relation to the first to third embodiments may control the brightness on the basis of the luminosity of the surrounding area. Furthermore, in FIG. 1, FIG. 5, FIG. 6, FIG. 10, FIG. 16 and FIG. 17 which were described in relation to the first to third embodiments, the shape of a non-portable image display apparatus is depicted, but similar beneficial effects to the foregoing are also displayed with other more compact compositions. The method of controlling the brightness on the basis of the luminosity of the surrounding area is especially useful in a see-through type of head-mounted display.

Furthermore, the respective embodiments described above are examples and needless to say, various modifications can be applied within a range that does not depart from the essence of the invention. Moreover, it is of course also possible to use a suitable combination of the constituent elements of the respective embodiments described above, or modified constituent elements thereof.

The respective modes of the present invention can be described as follows on the basis of the respective embodiments described above. More specifically, the image display apparatus relating to one aspect of the present invention includes: a light source which emits coherent light; a spatial modulation element which diffracts the coherent light by displaying a diffraction grating pattern corresponding to an input image and which displays a virtual image by the diffracted light; and a control unit which calculates a total brightness representing a sum total of brightnesses of all pixels of the input image, and controls at least one of the light source and the spatial modulation element in such a manner that, if the total brightness has decreased, the virtual image is displayed at a lower brightness than a reference virtual image displayed when the input image is used directly.

In this image display apparatus, at least one of the light source and the spatial modulation element is controlled in such a manner that a virtual image is displayed at a lower brightness than the reference virtual image displayed when the input image is used directly, if the total brightness has decreased, and therefore a virtual image is displayed by light diffracted by the spatial modulation element and it is possible to control the brightness of the virtual image in accordance with the sum total of the brightnesses of all of the pixels of the input image, and a virtual image can be displayed at a desired brightness without being affected by variation in the number of pixels having a high brightness in the input image.

Desirably, the image display apparatus further includes: a light shielding section which shields a portion of light emitted from the spatial modulation element, wherein the control unit adds a light shielding pattern that generates light directed towards the light shielding section, to the input image, and controls the spatial modulation element so as to display a diffraction grating pattern corresponding to the input image to which the light shielding pattern has been added.

In this case, since a light shielding pattern which generates light directed towards the light shielding section is added to the input image and the spatial modulation element is controlled so as to display a diffraction grating pattern corresponding to the input image to which the light shielding pattern has been added, then a diffraction grating pattern having a reduced amount of light directed towards the light shielding section is displayed and the brightness of the virtual image viewed by the observer can be increased, when the total brightness has increased, whereas a diffraction grating pattern having an increased amount of light directed towards the light shielding section is displayed and the brightness of the virtual image viewed by the observer can be reduced, when the total brightness has decreased. As a result of this, unwanted brightness changes occurring in the virtual image are suppressed and a virtual image can be displayed at a desired brightness, without being affected by variations in the number of pixels of high brightness in the input image.

Desirably, the light generated by the light shielding pattern includes zero-order diffraction light which is emitted from the spatial modulation element.

In this case, since the zero-order diffracted light is reflected rather than being diffracted by the spatial modulation element, then it is possible to display a virtual image having little noise, by shielding this reflected light.

Desirably, when the total brightness has decreased, the control unit enlarges a partial image of high brightness constituting the input image, and controls the spatial modulation element so as to display a diffraction grating pattern corresponding to the input image in which the partial image has been enlarged.

In this case, since a diffraction grating pattern corresponding to an input image in which the partial image of high brightness has been enlarged is displayed, when the total brightness has decreased, then it is possible to display a virtual image at a lower brightness than the reference virtual image displayed when the input image is used directly, and therefore a virtual image can be displayed at a desired brightness, even if the number of pixels of high brightness in the input image has decreased.

Desirably, the input image includes a plurality of text information images representing text characters as the partial image, and when the number of the text information images has decreased, the control unit changes a font size of the text information images in such a manner that the font size of the text information images becomes larger and controls the spatial modulation element so as to display a diffraction grating pattern corresponding to the input image in which the text information images have been changed.

In this case, since a diffraction grating pattern corresponding to an input image in which the font size of the text information images has been changed so as to become larger is displayed, when the number of text information images has decreased, then it is possible to display a virtual image at a lower brightness than the reference virtual image displayed when the input image is used directly, and therefore a virtual image can be displayed at a desired brightness, even if the number of text information images of high brightness in the input image has decreased.

Desirably, the input image includes a plurality of text information images representing text characters as the partial image, and when the number of the text information images has decreased, the control unit changes a font of the text information images in such a manner that the font of the text information images becomes thicker and controls the spatial modulation element so as to display a diffraction grating pattern corresponding to the input image in which the text information images have been changed.

In this case, since a diffraction grating pattern corresponding to an input image in which the font of the text information images has been changed so as to become thicker is displayed, when the number of text information images has decreased, then it is possible to display a virtual image at a lower brightness than the reference virtual image displayed when the input image is used directly, and therefore a virtual image can be displayed at a desired brightness, even if the number of text information images of high brightness in the input image has decreased.

Desirably, when the total brightness has decreased, the control unit adds a control pattern to the input image in such a manner that the virtual image is displayed at a lower brightness than the reference virtual image, and controls the spatial modulation element so as to display a diffraction grating pattern corresponding to the input image to which the control pattern has been added.

In this case, since a control pattern is added to the input image and a diffraction grating pattern corresponding to the input image to which the control pattern has been added is displayed, in such a manner that the virtual image is displayed at a lower brightness than the reference virtual image, if the total brightness has decreased, then it is possible to display a virtual image at a lower brightness than the reference virtual image displayed when the input image is used directly, and therefore a virtual image can be displayed at a desired brightness, even if the number of pixels of high brightness in the input image decreases.

Desirably, the control pattern includes an outer frame pattern of high brightness which is added at an outer periphery of the input image, and when the total brightness has decreased, the control unit changes the outer frame pattern in such a manner that a thickness of the outer frame pattern is increased, or in such a manner that a brightness of the outer frame pattern is increased, and controls the spatial modulation element so as to display a diffraction grating pattern corresponding to the input image in which the outer frame pattern has been changed.

In this case, when the total brightness has decreased, an outer frame pattern having a high brightness is added to the input image, the outer frame pattern is changed so as to increase the thickness of the outer frame pattern or so as to increase the brightness of the outer frame pattern, and a diffraction grating pattern corresponding to the input image having a changed outer frame pattern is displayed, and therefore it is possible to display a virtual image at a lower brightness than a reference virtual image displayed when the input image is used directly, and a virtual image can be displayed at a desired brightness, even if the number of pixels of high brightness has decreased.

Desirably, the control pattern includes a text string image containing a prescribed text string relating to the image display apparatus, and when the total brightness has decreased, the control unit changes the text string image in such a manner that the text string image becomes larger, or in such a manner that a brightness of the text string image is increased, and controls the spatial modulation element so as to display a diffraction grating pattern corresponding to the input image in which the text string image has been changed.

In this case, since the text string image is changed so as to make the text string image larger or so as to increase the brightness of the text string image, when the total brightness has decreased, and a diffraction grating pattern corresponding to an input image having a changed text string image is displayed, then it is possible to display a virtual image at a lower brightness than the reference virtual image displayed when the input image is used directly, and therefore a virtual image can be displayed at a desired brightness, even if the number of pixels of high brightness in the input image has decreased.

Desirably, the control pattern includes a uniform pattern having a uniform brightness with respect to the whole of the input image, and when the total brightness has decreased, the control unit changes a brightness of the uniform pattern in such a manner that the brightness of the uniform pattern is increased, and controls the spatial modulation element so as to display a diffraction grating pattern corresponding to the input image in which the brightness of the uniform pattern has been changed.

In this case, since the brightness of the uniform pattern is changed so as to increase the brightness of the uniform pattern, when the total brightness has decreased, and a diffraction grating pattern corresponding to an input image having a changed brightness of the uniform pattern is displayed, then it is possible to display a virtual image at a lower brightness than the reference virtual image displayed when the input image is used directly, and therefore a virtual image can be displayed at a desired brightness, even if the number of pixels of high brightness in the input image has decreased.

Desirably, the control pattern includes a distributed pattern which is distributed with respect to the whole of the input image, a brightness of peripheral portions being lower than a brightness of a central portion of the input image, and when the total brightness has decreased, the control unit changes a brightness of the distributed pattern in such a manner that the brightness of the central portion of the distributed pattern is increased, and controls the spatial modulation element so as to display a diffraction grating pattern corresponding to the input image in which the brightness of the distributed pattern has been changed.

In this case, since the brightness of the distributed pattern is changed so as to increase the brightness of the central portion of the distributed pattern, when the total brightness has decreased, and a diffraction grating pattern corresponding to an input image having a changed brightness of the uniform pattern is displayed, then it is possible to display a virtual image at a lower brightness than the reference virtual image displayed when the input image is used directly, and therefore a virtual image can be displayed at a desired brightness, even if the number of pixels of high brightness in the input image has decreased.

Desirably, the control unit controls an output of the light source in accordance with the total brightness.

In this case, since the output of the light source is controlled in accordance with the total brightness, it is possible to control the brightness of the virtual image in accordance with change in the total brightness, and the virtual image can be displayed at a desired brightness without being affected by variation in the number of pixels having high brightness in the input image.

Desirably, the control unit controls a lighting period of the light source in accordance with the total brightness.

In this case, since the lighting period of the light source is controlled in accordance with the total brightness, it is possible to control the brightness of the virtual image in accordance with change in the total brightness, and the virtual image can be displayed at a desired brightness without being affected by variation in the number of pixels having high brightness in the input image.

Desirably, the image display apparatus further includes an illumination light optics system which converts the coherent light from the light source into illumination light and emits the illumination light to the spatial modulation element.

In this case, since the wave front shape or the intensity distribution of the coherent light from the light source is changed by the illumination optics system, then it is possible to irradiate illumination light suited to the display of the virtual image, onto the spatial modulation element.

Industrial Applicability

The image display apparatus relating to the present invention is useful as a display apparatus, such as an HMD (head-mounted display), or the like, which has a spatial modulation element which diffracts coherent light, situated close to the eye, and in which the spatial modulation element displays a diffraction grating pattern and diffracted light from the spatial modulation element reaches an expected position of an eye. Furthermore, the present invention can also be applied to a display system, a display method, a display apparatus design method, and the like.

The invention claimed is:

1. An image display apparatus, comprising:
   a light source which emits coherent light;
   a spatial modulation element which diffracts the coherent light by displaying a diffraction grating pattern corresponding to an input image and which displays a virtual image by the diffracted light; and
   a control unit which calculates a total brightness representing a sum total of brightnesses of all pixels of the input image, and controls at least one of the light source and the spatial modulation element in such a manner that, if the total brightness has decreased, the virtual image is displayed at a lower brightness than a reference virtual image displayed when the input image is used directly,
   wherein, when the total brightness has decreased, the control unit adds a control pattern, which includes an image different from the input image, to the input image in such a manner that the virtual image is displayed at a lower brightness than the reference virtual image, and controls the spatial modulation element so as to display a diffraction grating pattern corresponding to the input image to which the control pattern has been added.

2. The image display apparatus according to claim 1, wherein the control pattern includes an outer frame pattern of high brightness which is added at an outer periphery of the input image, and
   when the total brightness has decreased, the control unit changes the outer frame pattern in such a manner that a thickness of the outer frame pattern is increased, or in such a manner that a brightness of the outer frame pattern is increased, and controls the spatial modulation element so as to display a diffraction grating pattern corresponding to the input image in which the outer frame pattern has been changed.

3. The image display apparatus according to claim 1, wherein the control pattern includes a text string image containing a prescribed text string relating to the image display apparatus, and
   when the total brightness has decreased, the control unit changes the text string image in such a manner that the text string image becomes larger, or in such a manner that a brightness of the text string image is increased, and controls the spatial modulation element so as to display a diffraction grating pattern corresponding to the input image in which the text string image has been changed.

4. The image display apparatus according to claim 1, wherein the control pattern includes a uniform pattern having a uniform brightness with respect to the whole of the input image, and
   when the total brightness has decreased, the control unit changes a brightness of the uniform pattern in such a manner that the brightness of the uniform pattern is increased, and controls the spatial modulation element so as to display a diffraction grating pattern corresponding to the input image in which the brightness of the uniform pattern has been changed.

5. The image display apparatus according to claim 1, wherein the control pattern includes a distributed pattern which is distributed with respect to the whole of the input image, a brightness thereof in peripheral portions being lower than a brightness in a central portion of the input image, and
   when the total brightness has decreased, the control unit changes a brightness of the distributed pattern in such a manner that the brightness of the central portion of the distributed pattern is increased, and controls the spatial modulation element so as to display a diffraction grating pattern corresponding to the input image in which the brightness of the distributed pattern has been changed.

6. The image display apparatus according to claim 1, wherein the control unit controls an output of the light source in accordance with the total brightness.

7. The image display apparatus according to claim 1, wherein the control unit controls a lighting period of the light source in accordance with the total brightness.

8. The image display apparatus according to claim 1, further comprising an illumination optics system which converts the coherent light from the light source into illumination light and emits the illumination light to the spatial modulation element.

* * * * *